United States Patent Office 3,272,272
Patented Sept. 13, 1966

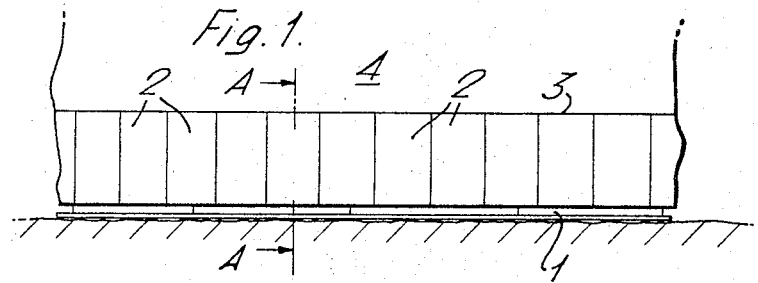
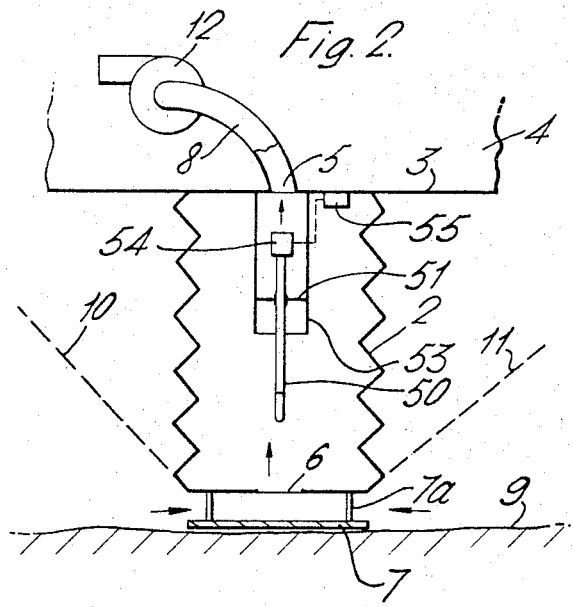
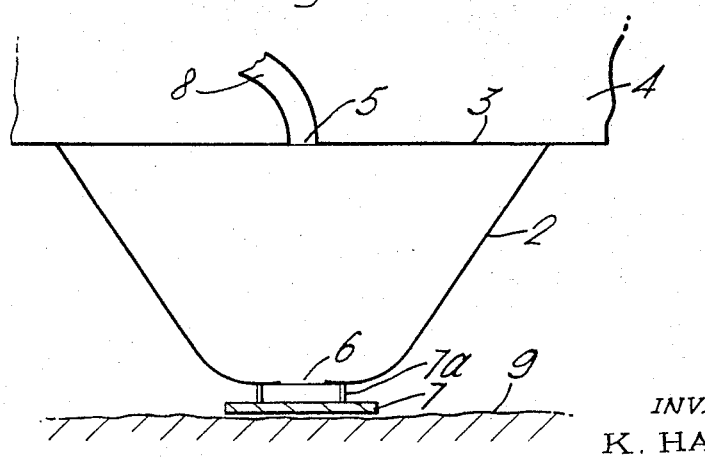

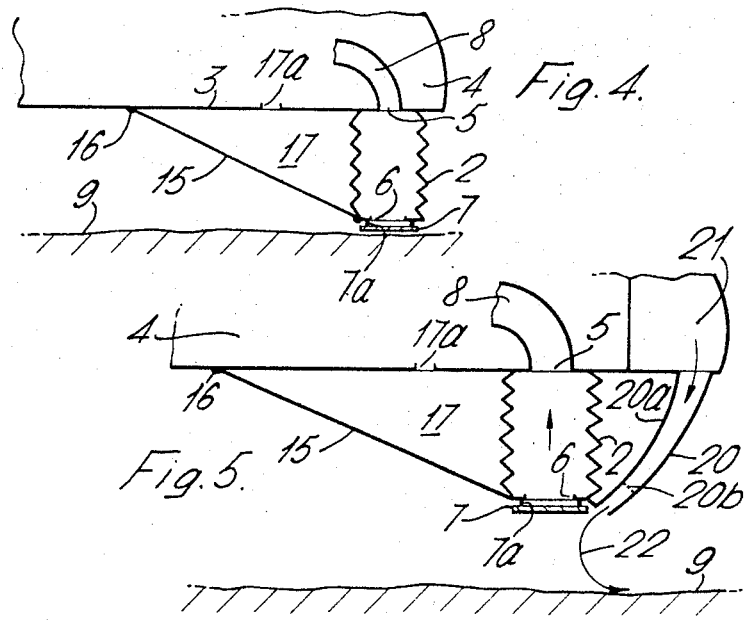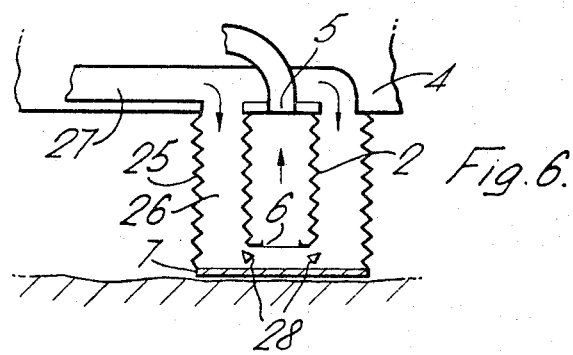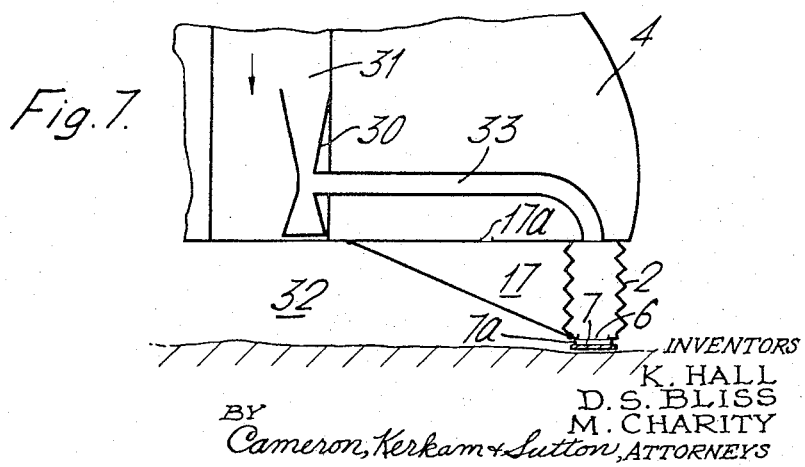

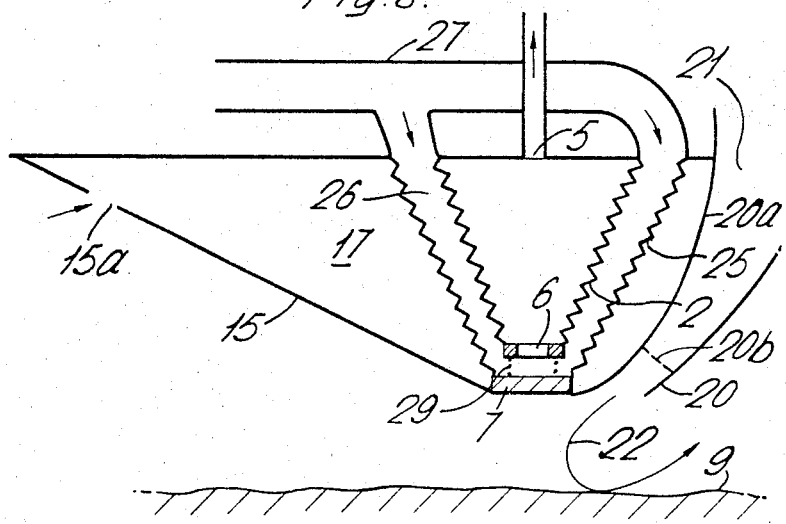
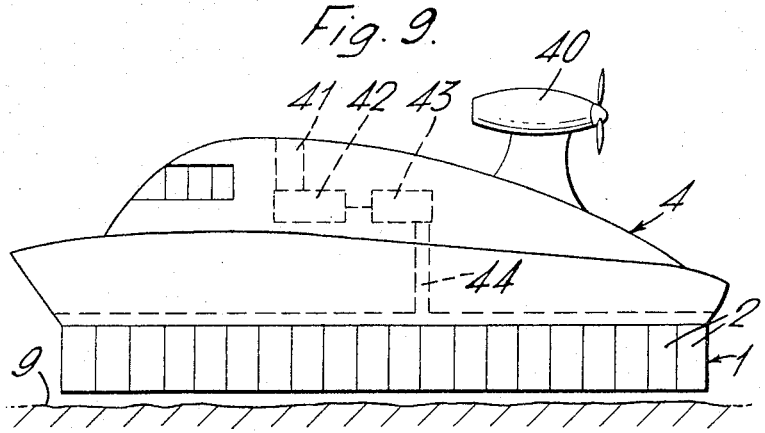

3,272,272
AIR CUSHION VEHICLES HAVING VERTICAL COLLAPSIBLE WALLS
Kenneth Hall, Hythe, Denys Stanley Bliss, Ashurst, and Michael Charity, Langley, England, assignors to Hovercraft Development Limited, London, England, a British company
Filed June 16, 1964, Ser. No. 375,493
Claims priority, application Great Britain, June 21, 1963, 24,821/63
16 Claims. (Cl. 180—7)

This invention relates to vehicles for traveling over a surface and which, in operation, are supported above that surface, at least in part, by a cushion of pressurised gas formed and contained beneath the vehicle.

The cushion of pressurised gas may be contained at its periphery by a wall depending below the main body of the vehicle, the wall being flexible or flexibly attached to the main body of the vehicle. A curtain of moving fluid may or may not be formed from the bottom of the wall.

In some forms of vehicle, the wall is deflected upwards over obstacles purely by physical contact between the bottom of the wall and the obstacle. This means, however, that at high speeds considerable damage can occur to the wall and undesirable loads applied to the vehicle. Even at low speeds erosion of the wall can occur at a very high rate, necessitating constant replacement or repair of the wall.

It has been proposed to provide means such as skids, hydrofoils or planing surfaces for causing deflection of the wall. However damage can also occur to these devices and they add weight to the vehicle structure.

According to the present invention, for a vehicle which, in operation, is supported above a surface, at least in part, by a cushion of pressurised gas formed and contained beneath the vehicle, a hollow wall is provided for downward projection beneath the vehicle body so as to contain, at least in part, the cushion, the wall being collapsible in an upward direction, means for applying a suction to the interior of the wall to promote collapse of said wall and inlet means for relieving said suction so as to avert said collapse, said inlet means being arranged so that relief of the suction diminishes as the distance between the bottom of the wall and the surface below the vehicle decreases.

This invention will be readily understood by the following description of certain embodiments, by way of example, in conjunction with the accompanying drawings in which:

FIGURE 1 is a side view of a wall formed of a series of members,

FIGURE 2 is a vertical cross-section through a wall on the line A—A of FIGURE 1, illustrating one form of the invention, FIGURE 3 is a cross-section similar to that of FIGURE 2 illustrating a further form of the invention, FIGURE 4 is a further cross-section similar to that of FIGURE 2 illustrating another form of the invention, FIGURE 5 illustrates a modification of the embodiment illustrated in FIGURE 4, FIGURE 6 is another cross-section similar to that of FIGURE 2 illustrating yet a further form of the invention, FIGURE 7 illustrates diagrammatically one way of providing suction, FIGURE 8 illustrates yet another form of the invention, and FIGURE 9 illustrates a vehicle for which any of the illustrated walls are suitable.

As illustrated in FIGURES 1 and 2, the wall 1 comprises a series of collapsible wall members 2 each in the form of a hollow tube having corrugated walls for easy collapse. Each wall member is attached at the top to the bottom surface 3 of the main body of the vehicle 4. As seen more clearly in FIGURE 2, which is a cross-section through a wall member 2, a port 5 formed in the bottom surface 3 communicates with the interior of the member. The bottom of the wall member is closed except for an orifice 6. An orifice restriction member in the form of flexible ribbon 7 extends below the wall 1 and normally is spaced a short distance from the bottom of each wall member 2. The ribbon 7 is attached to the bottom of the wall 1 at convenient intervals by resilient struts 7a. A duct 8 connects each port 5 to a suction pump 12. Application of a suction to the wall member promotes collapse of the wall.

As illustrated in FIGURES 1 and 2, the wall is shown applied to the main body of a plenum chamber vehicle, i.e. a vehicle in which a pressurised gas cushion is contained beneath the vehicle simply by a wall around the periphery of the cushion. In operation, the bottom face of the ribbon 7 is presented to and is normally in contact with the surface 9, the excess fluid supplied to maintain the gas cushion normally escaping through the clearance between the ribbon 7 and wall 1. If the wall 1 is serving as dividing member between two gas cushions, or parts of a cushion, a similar operating condition arises, any flow from one cushion to another taking place through the clearance.

To restrain the wall 1 against transverse thrust such as the pressure of the cushion acting upon it when the wall is at the periphery of the vehicle, one or more tie members 10 can be provided. Further tie members 11 can also be provided if desired, as for example, where the wall separates two cushions and a differential pressure may act on one side or the other depending on the operating conditions.

In operation, a suction is applied by the pump 12 to the interior of each wall member 2 by way of the ducts 8 and fluid (ambient air) flows into each member through the orifices 6 to relieve the suction and so avert collapse. A particular datum pressure occurs in the interior of each wall member, and this pressure can be predetermined to some extent by calculated selection of the cross-sectional areas of the orifices 6. If the vehicle meets an obstruction, such as a wave, or a solid obstacle of similar size, the ribbon 7 is deflected upwards (the struts 7a yielding to allow this deflection) to restrict the flow of fluid through one or more of the orifices 6 so that relief of the suction diminishes. As the pressure in the interior of the wall members 2 affected decreases, the members collapse upwards under differential pressure loading. The amount of collapse will depend upon the height of the obstruction, as once the members 2 have collapsed sufficiently to clear the obstruction, the ribbon 7 will move downwardly away from the orifices 6 and allow an increased flow of fluid therethrough to restore relief of the suction to a normal level. A relative position of ribbon 7 to orifice 6 will occur which will maintain the wall members 2 at the desired degree of collapse until the obstacle has been passed. The wall 1 can deflect as a whole, as for example, will be the case for a wall extending parallel to an obstacle, or locally as when passing over obstacles normal to the length of the wall, or where obstacles are small and of limited area.

The vehicle 4 can also operate with the ribbon 7 normally clear of the surface 9. In this case there will not be any collapse of a member 2 until after the clearance between the ribbon 7 and the surface 9 has been taken up. In order to avoid the ribbon 7 remaining attached to the bottoms of the wall members 2 once the orifices 6 have been closed, it is desirable to provide some means for positively and resiliently urging the ribbon 7 away from the bottoms of the wall members 2, such as light springs, or by providing stops or the like to limit upward movement of the ribbon 7 and thus prevent the ribbon from completely shutting off the orifices 6.

Instead of a continuous ribbon extending along the wall, there may be provided separate sections of ribbon, each section being attached to the bottom of the wall 1 beneath each orifice. Alternatively, other means can be provided to close or partly close the orifices 6, such as spheres or bodies of other shapes, all of which may be hollow, and which normally hang below the orifices but are deflected up into the orifices when the body to surface clearance decreases. As in the case of the continuous ribbon described above, it may be necessary to provide some means, such as springs or similar resilient devices, for positively urging the separate sections of ribbon, or the bodies, away from the orifices so as to prevent the orifices 6 remaining closed after the ribbon to surface clearance has been restored.

The arrangement of FIGURE 2 (and similarly, the arrangements of the other figures of the present disclosure) is preferably provided with apparatus whereby the suction applied to the wall member 2 (or its equivalent) is broken at a predetermined point in upward movement of the wall member.

Such apparatus can comprise a probe 50 slidably supported in the boss of a spider 51 the legs of which are attached to an open-ended tubular component 53. The upper end of the component 53 is attached to the bottom surface 3 of the vehicle 4 and surrounds the port 5. The probe 50 is moved vertically within the spider 51 by an actuator 54 under the control of a pressure-sensing control device 55. The probe 50 is aligned with the orifice 6 and their relative cross-sections allow free passage of the probe through the orifice.

In operation, as relief of the suction applied to the interior of the wall member 2 diminishes and the wall member 2 collapses, the control device 55 senses a predetermined level of reduced pressure within the wall member and causes the probe 50 to be moved down, through the orifice 6, to contact the upper face of the ribbon 7 and so force the ribbon away from the wall member 2 to relieve the suction. Relief of the suction arrests collapse of the wall member 2 and allows (if the ribbon 7 is no longer in contact with an obstacle) the wall member to return to its original position. Restoration of normal pressure to the interior of the wall member 2 causes the control device 55 to restore the probe 50 to its original position.

In a simplified modification of the above described arrangement the actuator 54 and control device 55 are dispensed with and the probe 50 is fixed to the spider 51.

FIGURE 3 illustrates an alternative cross-section for the members 2. This frusto-conical cross-section provides some stiffness against deflection by the cushion. The operation is as described above for FIGURE 2.

FIGURE 4 illustrates an arrangement in which the wall is of the form as illustrated in FIGURES 1 and 2, with one or more tie members 15 connected between the bottom of the wall and a position 16 on the bottom surface 3 of the main body of the vehicle. The tie members 15 can be arranged to contain the cushion pressure leaving the wall members 2 to provide the vertical movement.

The tie members 15 can be of stiff, or even rigid construction, being flexibly connected to the members 2 and the bottom surface 3. If of stiff or rigid construction, the members 15 can be spaced apart and connected by flexible diaphragms or the like to provide a fluid-tight seal. Alternatively the tie members 15 can be in the form of a continuous flexible diaphragm. A space 17 between the members 15 and wall members 2 can be vented by means of a vent connection 17a to prevent or reduce pressure variations occurring in the space as a result of vertical deflections of the members 2. Means including a valve disposed in the connection 17a can also be provided for controlling the flow of fluid to and from the space 17 to vary the deflection characteristics of the wall. The means allow the space 17 to be pressurised from a suitable source.

The invention can also be used for vehicles in which curtains of moving fluid are formed below the walls. FIGURE 5 illustrates a modification of FIGURE 4 in which a flexible nozzle 20 is attached to the side of the wall 1 remote from the members 15. Fluid, such as air, is fed via a duct 21 to the nozzle 20, the fluid issuing from the bottom of the nozzle to form a curtain 22. When a vehicle with such a system is operating, there is a considerable clearance between the ribbon 7 and the surface 9. No deflection of the wall occurs until the height of any obstacle exceeds this clearance.

Instead of the nozzle 20 as illustrated being used, only the inner part 20a of this nozzle need be provided, the fluid then flowing down in contact with this part. The part 20a can be attached to the remainder of the nozzle 20 by a tie 20b.

In the examples so far described the fluid flowing into each member 2 through the orifices 6 has been from the surrounding atmosphere. It is thus likely to be a mixture of air and foreign substances, such as water, dust, sand and the like. The inclusion of such foreign substances may be undesirable. By arranging for the flow of fluid through the orifice to be from an "internal" source the inclusion of foreign substances can be prevented.

Thus instead of the flow of fluid through an orifice 6 being from the surrounding atmosphere, as in FIGURE 4, the flow can be made from an "internal" source by connecting the lower ends of members 15 to the inner edge of the ribbon 7, and providing a flexible seal between the outer edge of the ribbon 7 and the bottom of the wall. The flow of fluid through the orifices 6 will then be from the space 17 which is in turn connected to a suitable source such as the outlet of the suction producing means. FIGURE 6 illustrates an arrangement in which each wall member 2 is spaced from and enclosed within a collapsible shroud in the form of an outer tubular wall member 25 attached at its top end to the bottom surface 3 and at its lower end to the ribbon 7. The fluid flow through the orifice 6 is from the annular chamber 26 formed between the two tubes forming each member. Chamber entry means in the form of a duct 27 supplies the orifice 6 with fluid. The flow of fluid through the system can thus be maintained free from any foreign matter. Additional restrictors 28 may be provided to regulate the flow of fluid. If the restrictors are attached to the ribbon 7 they will move up with the ribbon 7 when an obstacle is met.

Suction within a wall can be obtained by the use of suitable apparatus other than a suction pump. The use of an existing flow of fluid to produce the suction would be convenient and FIGURE 7 illustrates an arrangement in which the supply of fluid to the cushion of a plenum chamber type vehicle can be used to create the desired suction. One or more ejector devices 30 are positioned in a duct 31 through which flows a stream of pressurized gas to the cushion space 32. Ducts 33 lead from the throat of the ejector to the members 2 which are of the form illustrated in FIGURE 4 and described above. The actual flow of fluid through the ducts 33 is very small, depending upon the size of the orifices 6.

Where fluid curtains are formed from the bottom of the walls, the flow of curtain forming fluid can be used to create the suction from the wall members 2 in a similar manner.

FIGURE 8 illustrates an arrangement which may be considered to be a combination of features illustrated in FIGURES 5 and 6. The figure shows inner and outer collapsible wall members 2, 25 both of trunco-conical form and defining the annular chamber 26 therebetween to which is connected the fluid supply duct 27. The ribbon 7 is attached to the bottom of the member 25 by resilient struts 7a and a light spring 29 is disposed between the bottom of the member 2 and the top face of the ribbon 7. The space 17 is open to cushion pressure by way of a port 15a in the member 15.

FIGURE 9 illustrates the vehicle 4, which is propelled across the surface 9 by a propeller unit 40. Atmospheric air for the supporting cushion(s) and/or cushion-containing curtains is drawn in through an intake 41 by a compressor 42 driven by an engine unit 43. After compression the air is supplied to the cushion space(s) and/or the curtain-creating nozzles by way of ducts 44.

Although in the examples described above the wall has been considered as comprising a series of wall members 2, it can be a single wall subdivided. Its construction is preferably such that local deflection upwards can occur. Again, the wall may comprise a series of separate wall members spaced apart but connected by a flexible membrane. Subdivisions of the wall, either by forming it of a series of separate members, or one or more members subdivided, improves the stability of the vehicle. By providing positive control of the deflection of a member, or members, such as by controlling the pressure in the space 17 of FIGURES 4 and 5, enables a direct stabilising force to be applied to the vehicle by inter-reaction between the bottom of the wall and the surface.

We claim:
1. A vehicle which, in operation, is supported above a surface, at least in part, by a cushion of pressurised gas formed and contained beneath the vehicle, comprising a hollow wall for downward projection beneath the vehicle body so as to contain, at least in part, the cushion, the wall being collapsible in an upward direction, means for applying a suction to the interior of the wall to reduce the pressure therein below that of the space surrounding said wall and thereby promote collapse of said wall, inlet means for supplying fluid to the interior of the wall to relieve said suction and thereby avert said collapse, and inlet control means responsive to variations in the distance between the bottom of the wall and the surface below the vehicle for reducing the supply of fluid by said inlet means and thereby diminishing relief of the suction as said distance decreases.

2. A vehicle according to claim 1 wherein the inlet means comprises an orifice formed in the lower part of said wall, and the inlet control means comprises an orifice restriction member yieldably supported below said orifice and movable upwardly towards said orifice by contact of said member with said surface.

3. A vehicle according to claim 2 wherein said restriction member is of ribbon form disposed so that opposed faces are presented towards said orifice and said surface, respectively.

4. A vehicle according to claim 2 wherein the restriction member is resiliently attached to the wall.

5. A vehicle according to claim 2 wherein said restriction member is of flexible material.

6. A vehicle according to claim 2 including means for resiliently urging the restriction member away from the orifice.

7. A vehicle according to claim 2 including stop means for limiting movement of said restriction member towards said orifice.

8. A vehicle according to claim 1 including a collapsible shroud surrounding and spaced from the wall and defining with the wall a closed member in communication with the inlet means, and chamber entry means for supplying fluid to said chamber.

9. A vehicle according to claim 8 wherein said restriction member is attached to the shroud.

10. A vehicle according to claim 8 wherein said restriction member forms at least part of the bottom of the shroud.

11. A vehicle according to claim 1 including means including at least one nozzle for causing a fluid curtain to issue from the lower part of the wall so as to assist in containing the cushion supporting the vehicle.

12. A vehicle according to claim 1 including a duct through which a stream of gas flows to beneath the vehicle for formation of the supporting cushion, and wherein the means for applying a suction to the interior of the wall comprises an injector device disposed within said duct.

13. A vehicle according to claim 1 including at least one tie member connecting the lower part of the wall to the bottom of the vehicle body.

14. A vehicle according to claim 13 wherein the tie member comprises a flexible diaphragm which defines a space with said wall, and including means to control fluid flow to and from said space.

15. A vehicle according to claim 1 wherein the wall comprises a series of separate collapsible wall members, each of tubular form.

16. A vehicle according to claim 1 wherein the wall is of frusto-conical form.

No references cited.

BENJAMIN HERSH, *Primary Examiner.*

M. S. SALES, *Assistant Examiner.*